G. F. MAISCH.
COMPUTING MECHANISM FOR CHECKWRITERS.
APPLICATION FILED SEPT. 7, 1915.
1,311,526.
Patented July 29, 1919.
9 SHEETS—SHEET 1.
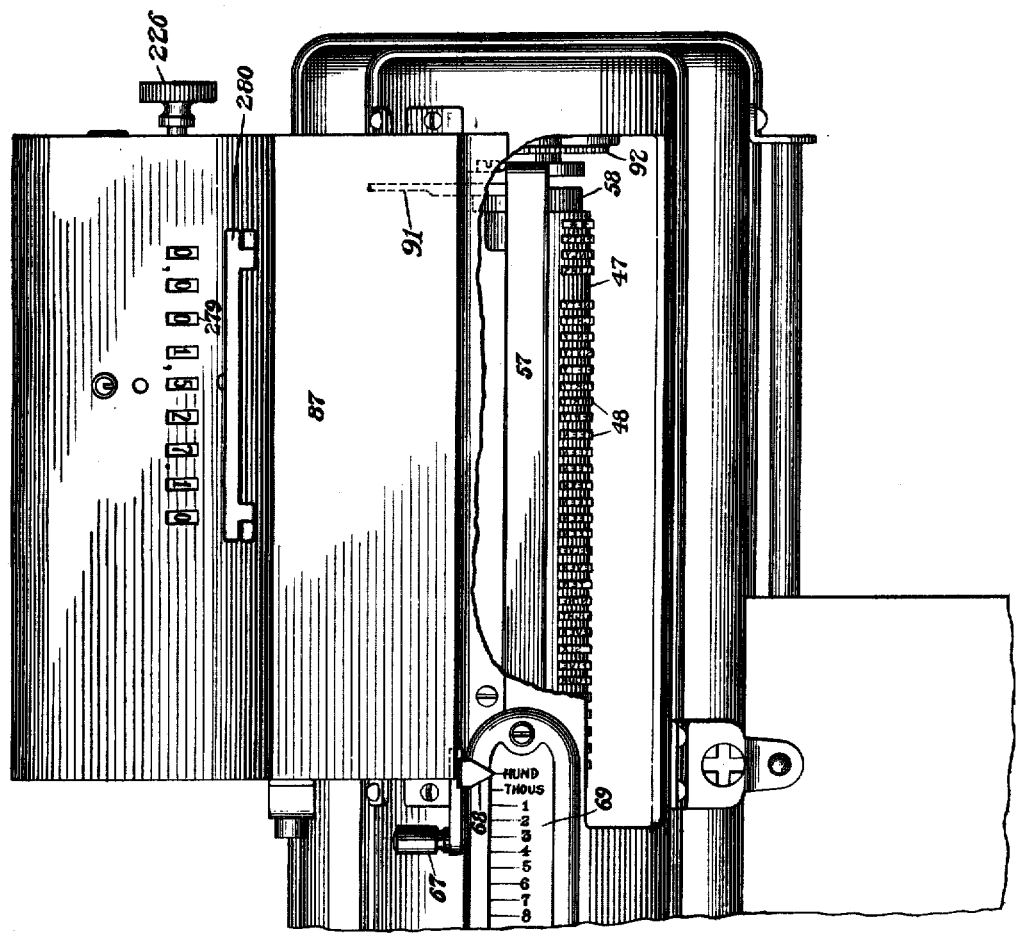
Fig. 1
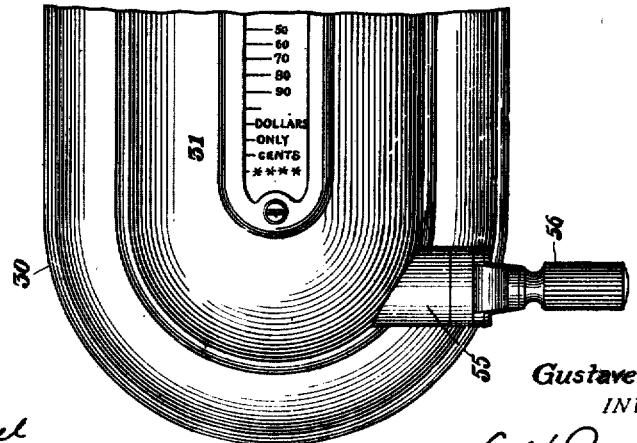
WITNESSES:
Charles F Tiefel
Magnus H. Johanson
Gustave F. Maisch
INVENTOR.
BY E H Cumpston Jr
HIS ATTORNEY.

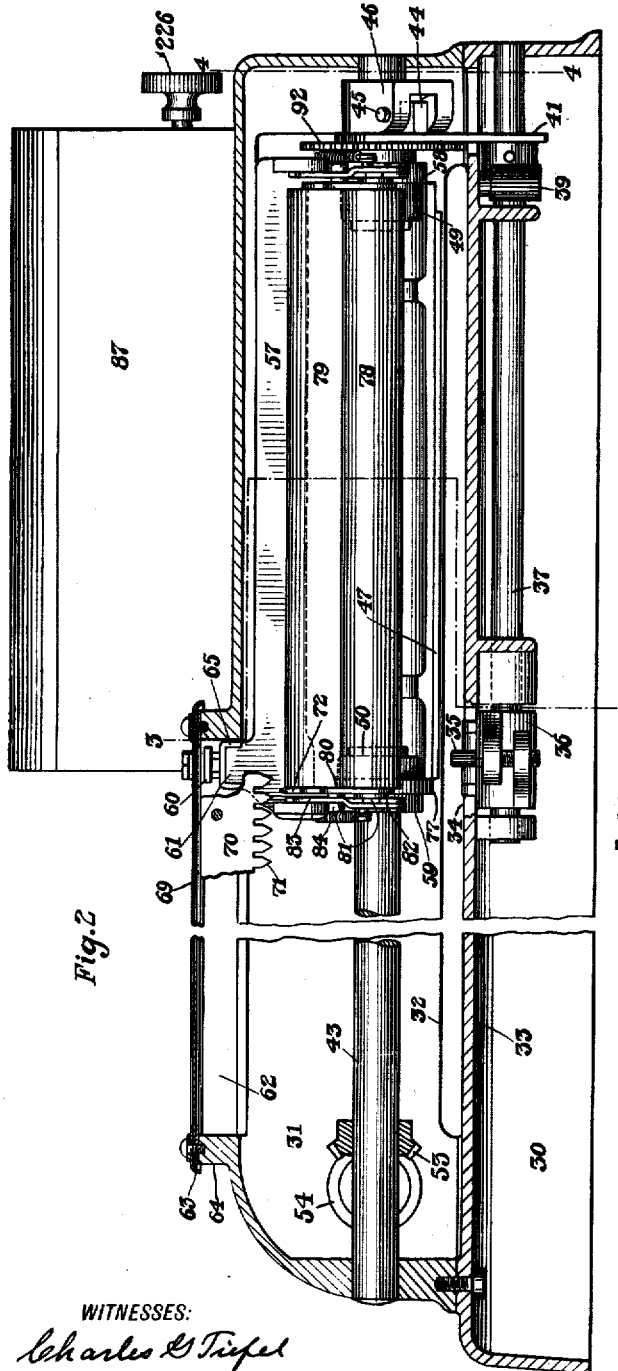

G. F. MAISCH.
COMPUTING MECHANISM FOR CHECKWRITERS.
APPLICATION FILED SEPT. 7, 1915.
1,311,526.
Patented July 29, 1919.
9 SHEETS—SHEET 3.
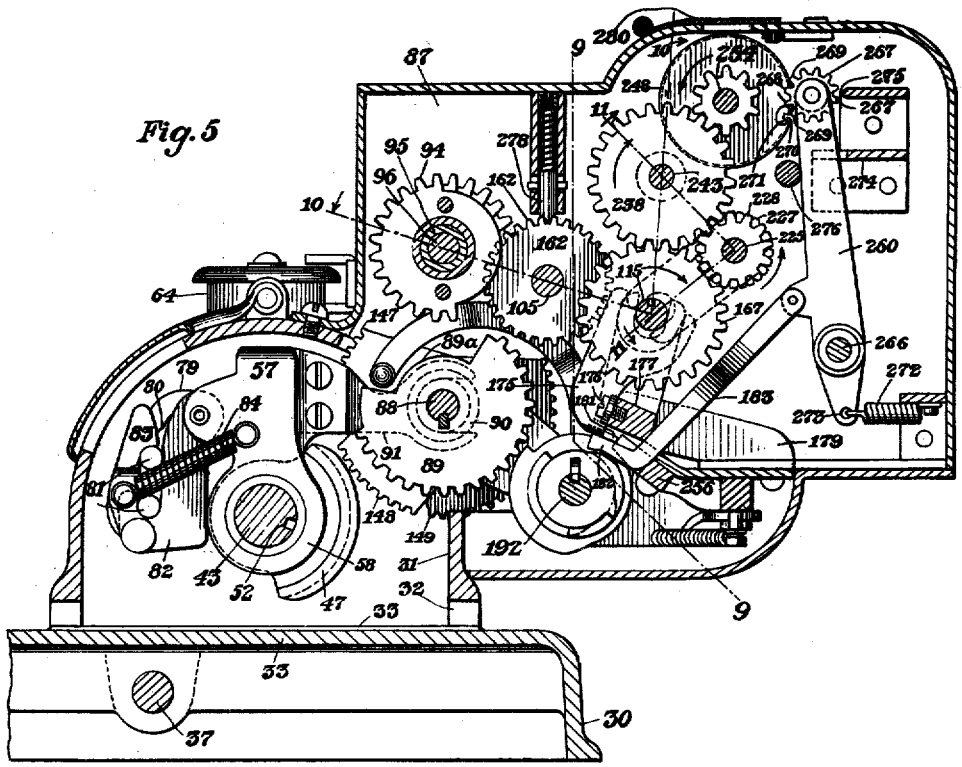
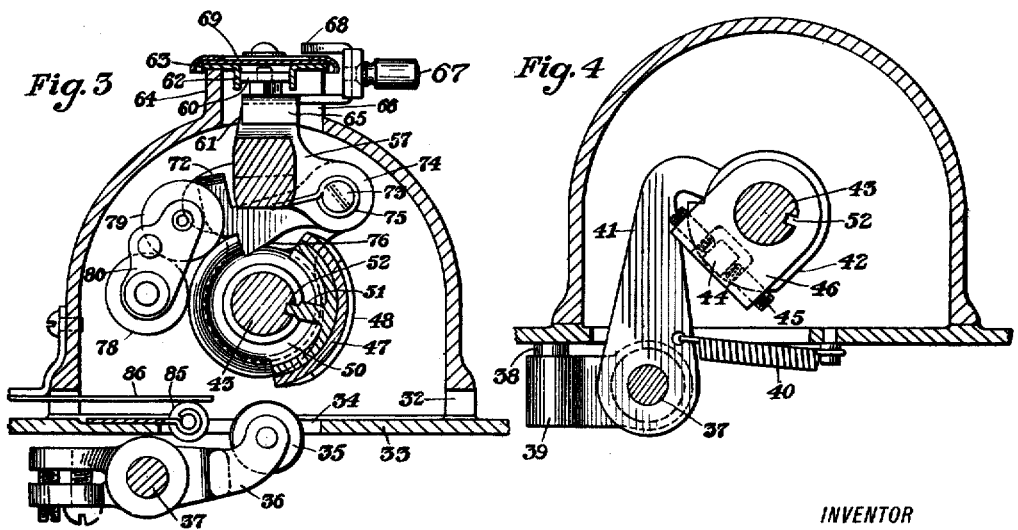
INVENTOR
Gustave F. Maisch
WITNESSES:
BY
HIS ATTORNEY G. F. MAISCH.
COMPUTING MECHANISM FOR CHECKWRITERS.
APPLICATION FILED SEPT. 7, 1915.
1,311,526.
Patented July 29, 1919.
9 SHEETS—SHEET 4.
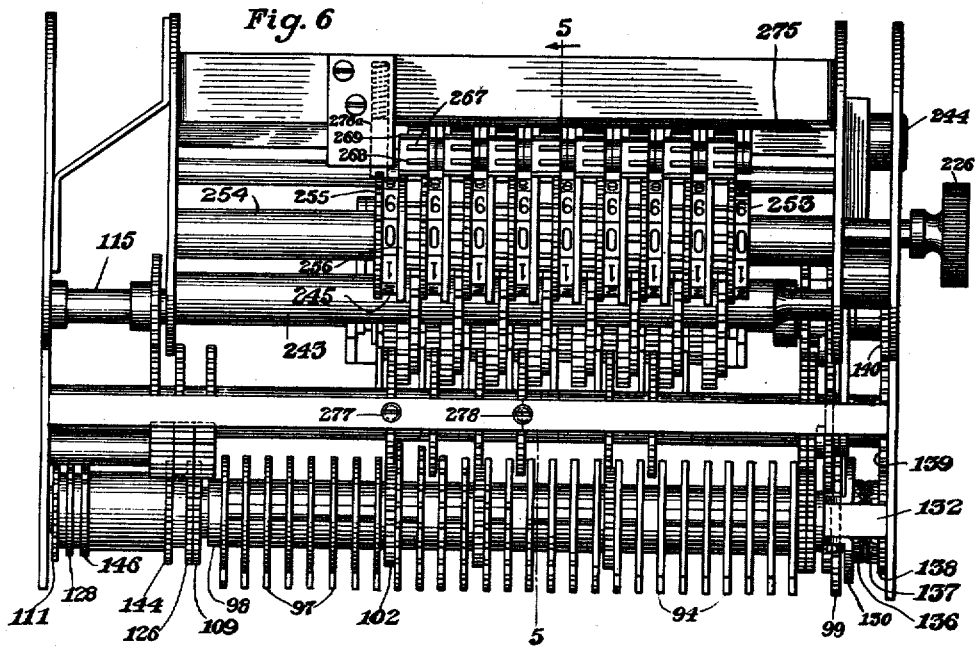
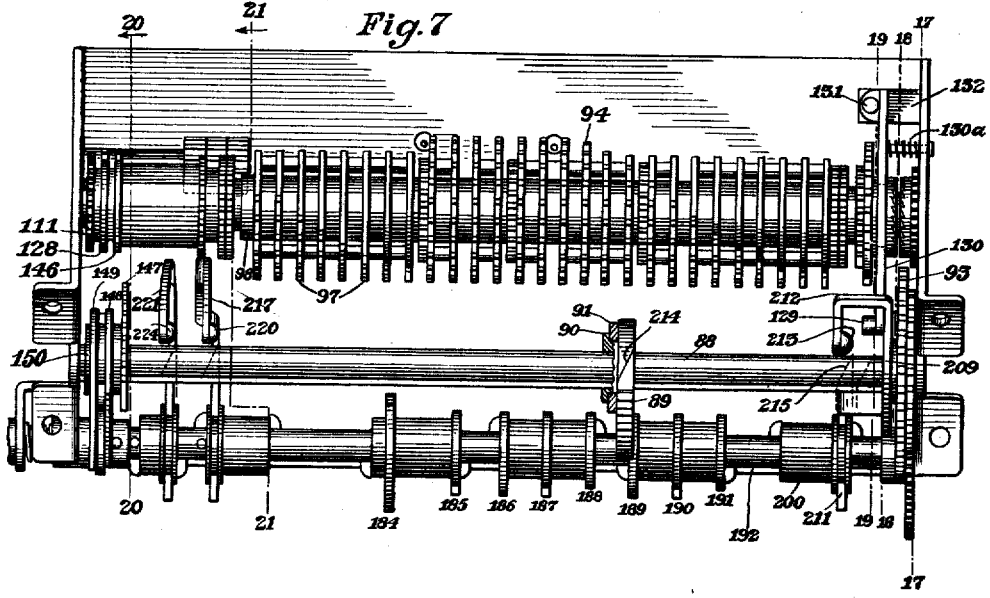
WITNESSES:
INVENTOR
Gustave F. Maisch
BY
HIS ATTORNEY G. F. MAISCH.
COMPUTING MECHANISM FOR CHECKWRITERS.
APPLICATION FILED SEPT. 7, 1915.

1,311,526.

Patented July 29, 1919.
9 SHEETS—SHEET 5.

WITNESSES:

Gustave F. Maisch
INVENTOR.

BY
HIS ATTORNEY.

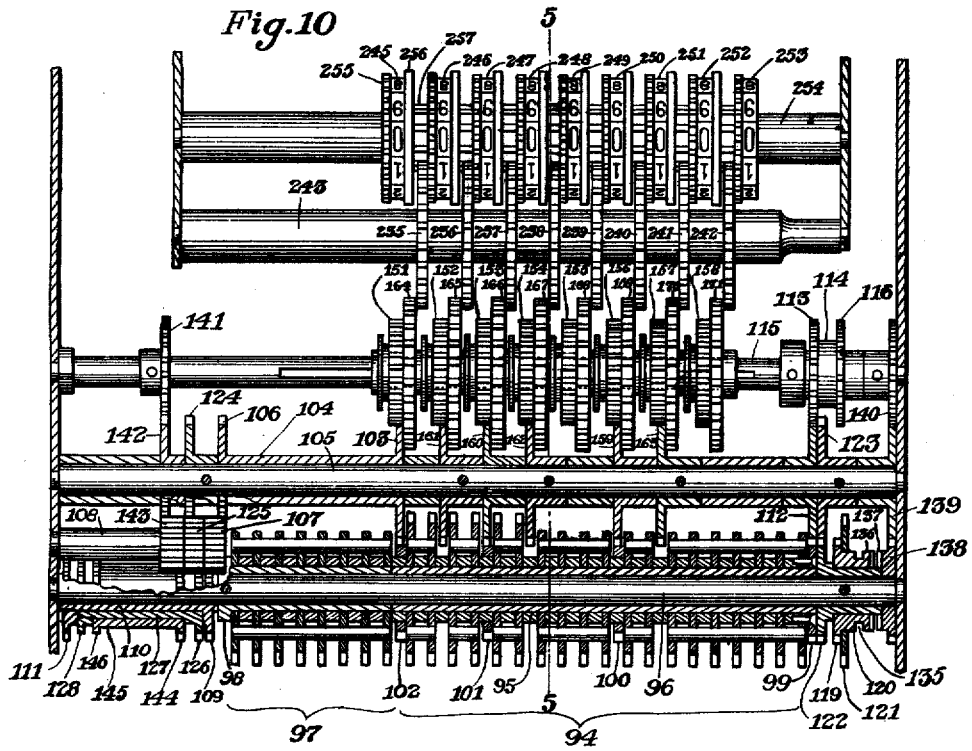
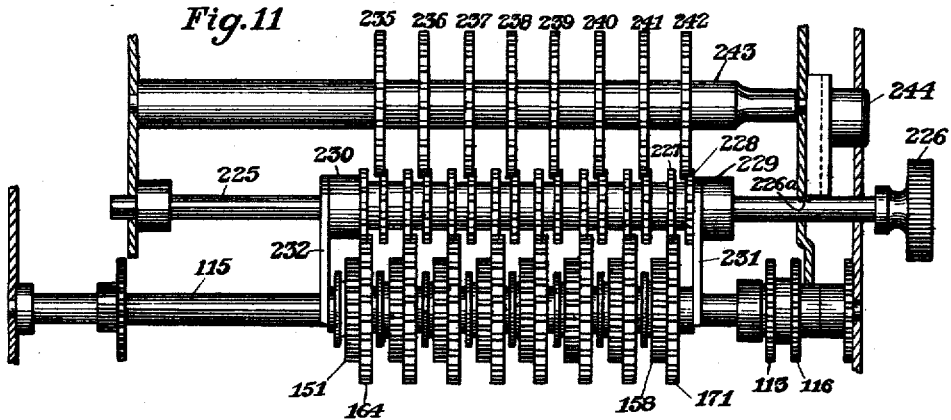

G. F. MAISCH.
COMPUTING MECHANISM FOR CHECKWRITERS.
APPLICATION FILED SEPT. 7, 1915.
1,311,526.
Patented July 29, 1919.
9 SHEETS—SHEET 7.
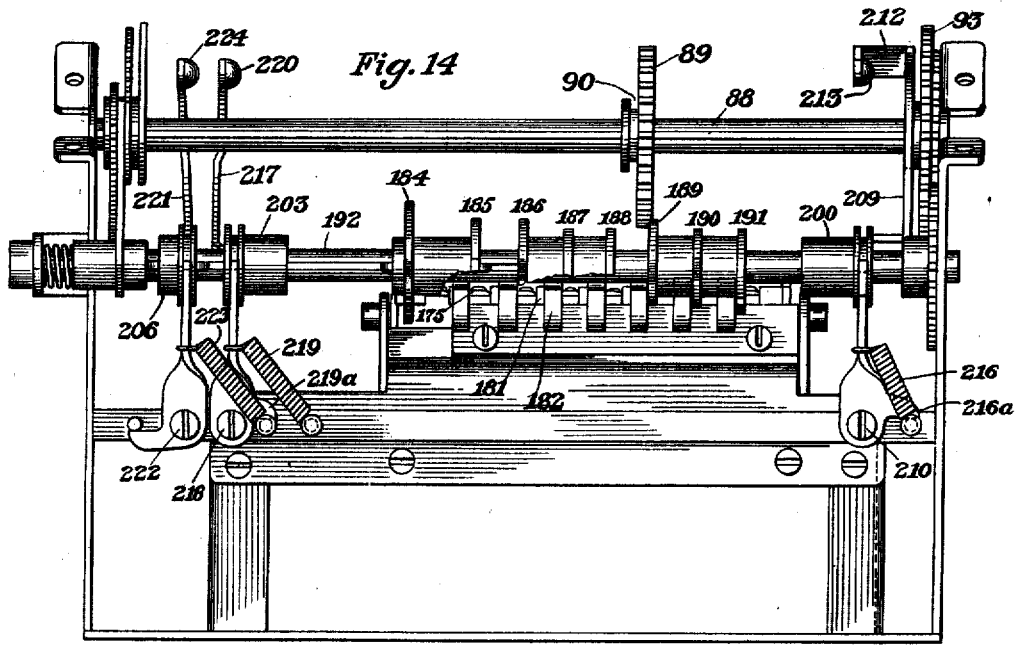
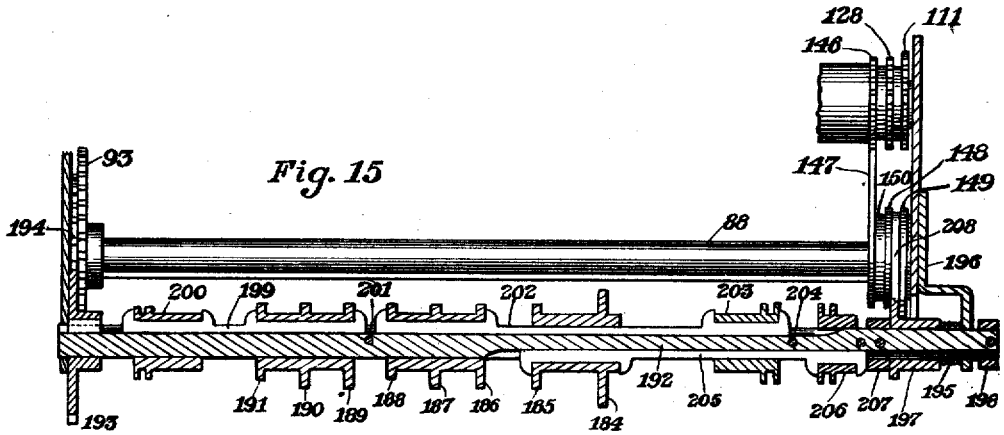
WITNESSES:
Charles G. Triefel
Magnus H. Johnson
INVENTOR
Gustave F. Maisch
BY
E. H. Cumpston Jr.
HIS ATTORNEY G. F. MAISCH.
COMPUTING MECHANISM FOR CHECKWRITERS.
APPLICATION FILED SEPT. 7, 1915.
1,311,526.
Patented July 29, 1919.
9 SHEETS—SHEET 8.
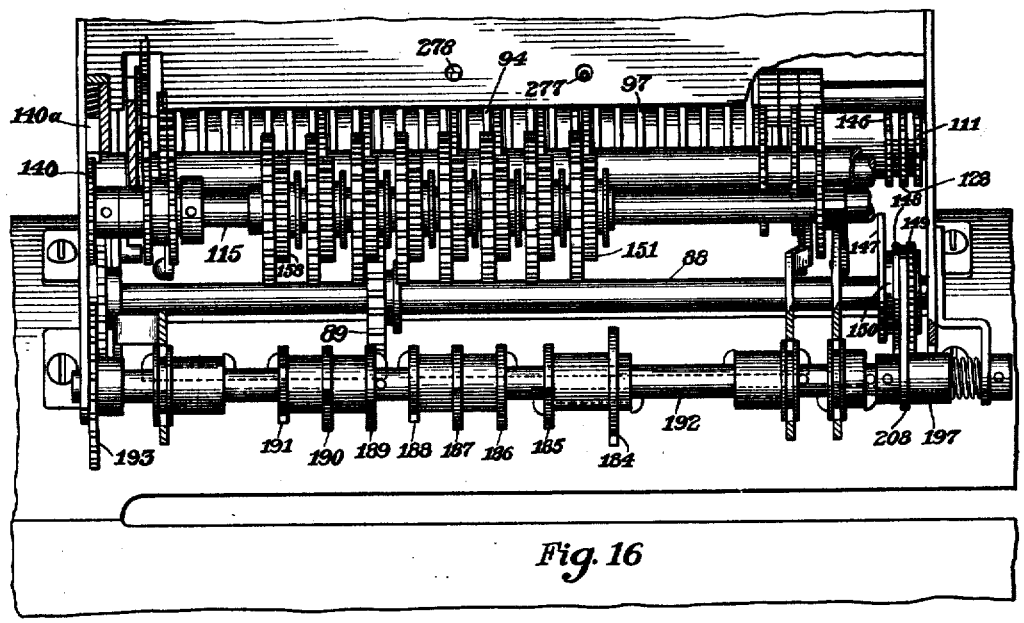
Fig. 16
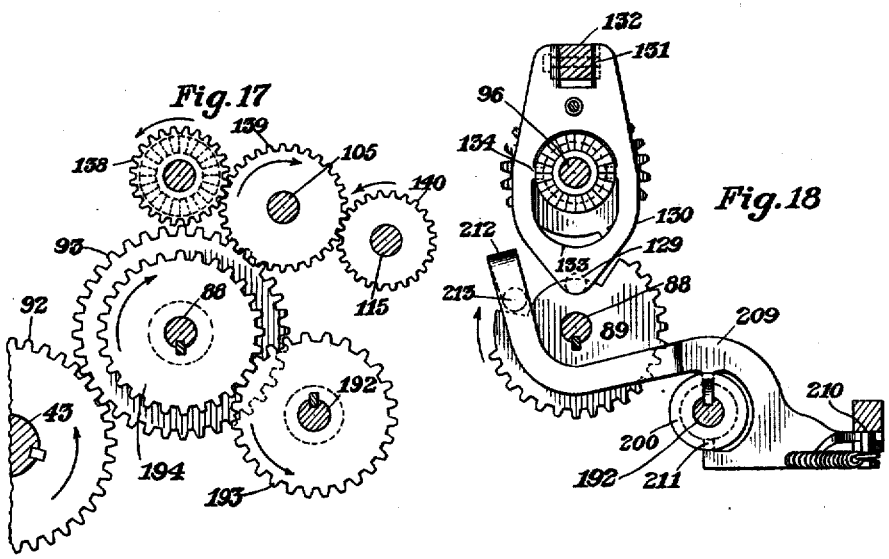
Fig. 17
Fig. 18
WITNESSES:
Charles G. Teufel
Magnus H. Johanson
INVENTOR
Gustave F. Maisch
BY
E. H. Cumpston Jr.
HIS ATTORNEY G. F. MAISCH.
COMPUTING MECHANISM FOR CHECKWRITERS.
APPLICATION FILED SEPT. 7, 1915.

1,311,526.

Patented July 29, 1919.
9 SHEETS—SHEET 9.

WITNESSES:

INVENTOR
Gustave F. Maisch

BY
HIS ATTORNEY

UNITED STATES PATENT OFFICE.

GUSTAVE F. MAISCH, OF CHICAGO, ILLINOIS, ASSIGNOR, BY MESNE ASSIGNMENTS, TO TODD PROTECTOGRAPH COMPANY, INC., OF ROCHESTER, NEW YORK, A CORPORATION OF NEW YORK.

COMPUTING MECHANISM FOR CHECKWRITERS.

1,311,526.     Specification of Letters Patent.     Patented July 29, 1919.

Application filed September 7, 1915. Serial No. 49,234.

*To all whom it may concern:*

Be it known that I, GUSTAVE F. MAISCH, a citizen of the United States, and a resident of Chicago, in the county of Cook and State of Illinois, have invented certain new and useful Improvements in Computing Mechanism for Checkwriters; and I do hereby declare the following to be a full, clear, and exact description of the same, such as will enable any person skilled in the art to which the invention appertains to make and use the same.

This invention relates to printing machines of the kind adapted for writing in the amount of a check, or other negotiable instrument, to protect it against alteration, and commonly known as "check writing" machines.

One object of the invention is to provide a machine of this kind with a device for computing and indicating the amount of the balance remaining in bank to the credit of a given account. To this end the machine is adapted to add the amounts deposited, as the deposit slips are printed by the machine, and to subtract from the sum of such deposits, the amounts of the checks drawn against the account as the checks are printed by the machine, the balance being shown on a series of accumulating wheels, or other convenient form of accumulating device.

Machines of this type are commonly provided with a plurality of type forms adapted for printing the various digits of the amount, and movable, selectively, into position to coöperate with a platen by a relative printing movement of the latter and the type forms, and it is another object of the invention to provide this class of machines with a computing mechanism adapted to receive movements, predetermined in extent by the selective movement of the type forms, and imparted by the relative printing movement of the latter and platen.

In machines adapted for printing out amounts in words by printing in succession the words denoting the digits of the amount and associated words indicating the significance of the digits, so that each digit is printed before the word which denotes its value, and without any accompanying designation of the significant place of the amount in which the digit belongs, in order to register the amounts printed provision must be made for recording each digit until its associated significant word is printed, and for then transmitting the digit to the accumulating devices in accordance with its value. Another object of the invention is to provide a computing mechanism for a printing machine having devices adapted to temporarily retain, or store, one or more digits after the latter are printed, so that they may be subsequently transferred to the proper accumulating devices in accordance with their respective significance.

Another object of the invention is to provide a computing mechanism for a printing machine having a simple and convenient means for changing the mode of operation of the machine from addition to subtraction, and vice versa, according as an amount is being printed on a deposit slip, or on a check, and to secure this means, as, in fact, the whole computing mechanism, against unauthorized operation or fraudulent attempts to alter the reading of the indicating device.

In computing mechanism applied to a machine of this class, it is desirable that the accumulating wheels be capable of direct, selective actuation from the mechanism, as well as of actuation from wheel to wheel by a carrying device, and, furthermore, to provide against overthrow, or other erroneous movement of the wheels, by very rapid operation, or jarring of the machine.

Another object of the invention, therefore, is to provide a computing mechanism having a reliable carrying mechanism the operation of which is adapted to permit direct operation of the wheels also, without any interference by one operation with the other, and having also a construction in which the accumulating wheels are positively geared at all times with other parts so as to be securely locked against inadvertent movement.

Other objects and advantages will appear from the following description of one embodiment of the invention illustrated in the accompanying drawings, in which:—

Figure 1 is a top plan view of the machine with the upper casing of the check writer partly broken away to show interior portions.

Fig. 2 is a longitudinal section in elevation of the check writer.

Fig. 3 is a sectional elevation of the check writer on the line 3—3 of Fig. 2, partly broken away.

Fig. 4 is a similar view on the line 4—4 of Fig. 2.

Fig. 5 is a sectional elevation through the check writer and computing mechanism taken on the line 5—5 of Fig. 6.

Fig. 6 is a top plan view of the computing mechanism.

Fig. 7 is an elevation of the same as viewed from the front, or side adjacent the check writer.

Fig. 10 is a section on the lines 10—10 of Fig. 5, with the intersected parts projected upon a single plane.

Fig. 11 is a sectional view on the lines 11—11 of Fig. 5, projected upon a single plane.

Figs. 12 and 13 are detail views of the gearing for changing the operation of the machine from addition to subtraction, and vice versa.

Fig. 14 is a bottom plan view of portions of the computing mechanism.

Fig. 15 is a sectional elevation from the rear of the cam shaft and adjacent parts.

Fig. 16 is a sectional elevation on the line 9—9 of Fig. 5, looking toward the front of the machine.

Fig. 17 is a sectional elevation of a portion of the gearing on the line 17—17 of Fig. 7.

Fig. 18 is a sectional elevation of a clutch mechanism taken on the line 18—18 of Fig. 7.

Fig. 24 is a fragmentary section on the motor shaft.

Figure 8:
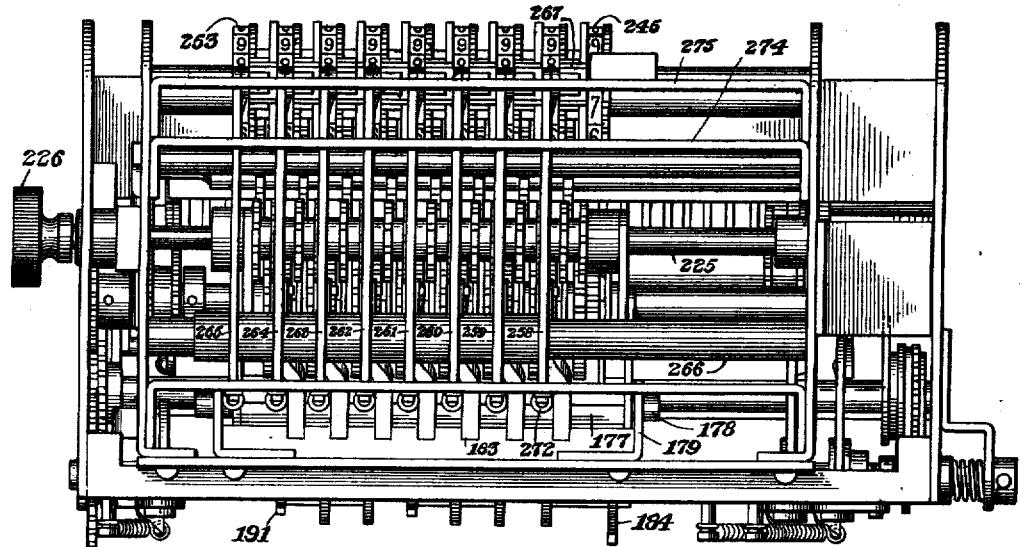
Fig. 8 is an elevation of the same from the back.

In the present embodiment of the invention the printing machine with which the computing mechanism is combined is similar in general to that disclosed in U. S. Letters Patent Number 1138330 granted jointly to L. M. Todd and C. G. Tiefel, May 4, 1915, for an improvement in check writers, and the construction and operation of this machine will now be briefly described.

The casing of the check writing machine comprises a lower, or base portion 30, and supported thereon, an upper portion 31. These portions of the casing are partially separated by an elongated work receiving slot 32, above a printing bed 33 on the base portion of the casing. The printing bed is provided with an opening 34, through which is adapted to be projected a small platen wheel 35 rotatably carried in a bracket 36 adjustably fixed to a shaft 37 extending longitudinally of the machine and rotatably journaled in lugs depending from the printing bed. The shaft 37 is adapted to be rocked in its bearings to raise and lower the platen, and the downward movement of the latter is limited by the contact with the under side of the printing bed of a stop 38 (Fig. 4) carried by an arm 39 fixed to the shaft 37. The platen is normally retained in this lower position by means of a spring 40 attached to the printing bed and to an arm 41 fixed to the shaft 37.

The platen is raised into position to contact with the type forms in the casing above, later to be described, by means of the arm 41 which projects upwardly through the printing bed and engages at its upper end the surface of a cam 42 mounted on a shaft 43 journaled at its ends in the end walls of the upper portion of the casing. Means are provided for adjusting the position of this cam upon the shaft comprising a lug 44 (Fig. 4) on the cam extending between and engaged by a pair of set screws 45 carried in a forked arm 46 fixed to the shaft.

The type carrier is a cylindrical member 47 carrying on its periphery a plurality of type forms 48 (Fig. 1) which extend circumferentially of the cylinder and are spaced apart for individual coöperation with the platen, the rear ends of all the type forms being in alinement longitudinally of the cylinder for a purpose which will later appear. The carrier has ends 49 and 50 provided with bearings on the shaft 43, and the carrier is adapted to slide longitudinally of the shaft, but is rotated by the shaft through the agency of a key 51 (Fig. 3) on the carrier engaging a keyway 52 in the shaft. The shaft is rotated by means of a gear 53 thereon, meshing with a gear 54 fixed to a short operating shaft journaled in a bearing 55 in the upper portion of the casing and extending exteriorly of the latter, where the shaft is provided with an operating crank 56.

The operation of the parts thus far described is suggested by the description of the construction. The carrier 47 having been located with one of the type forms in printing position opposite the platen 35, rotation of the shaft 43 by means of the handle 56 rotates the type form toward the platen, and, just previous to contact between the printing surfaces, the cam 42 on the shaft 43, operating the arm 41, rocks the shaft 37 and raises the platen into position to engage the type form. As previously pointed out, the type forms have their rear ends in alinement, and as this common line of termination passes the point of contact with the platen the cam 42 allows the shaft 37 to be rocked by the spring 40 so as to return the platen to initial position.

The means for shifting the position of the cylinder longitudinally of the shaft 43 comprises a yoke 57 (Fig. 2) having ends 58 and 59 (Figs. 2 and 5) closely embracing the ends of the carrier 47, the ends of the yoke being journaled on the shaft 43 so that the yoke may be moved longitudinally of the shaft to shift the position of the cylinder, but the yoke is held against rotation with the shaft by means of a small roller 60 (Fig. 3) mounted on a lug 61 of the yoke in position to slide between a pair of spaced flanges 62 depending from a plate 63 supported on a flange 64 on the top of the casing. Attached to the lug 61 is a plate 65 extending through an opening 66 in the flange 64 and provided outside the casing with a handle 67 by means of which the yoke and type carrier may be moved to bring the various type forms 48, selectively, into printing position opposite the platen. The plate 65 is extended horizontally at its upper end to form a pointer 68 adapted to move over a dial 69 supported on the plate 63 and provided with a column of characters corresponding to the various type forms on the carrier 47.

As the surfaces of the type forms and platen are provided with projecting ridges, as indicated in Fig. 2, adapted to mesh with each other to break the paper during the printing operation, a means is provided for insuring exact registry at the time of contact of these coöperating surfaces of the type forms and platen, comprising a comb or rack 70 (Fig. 2) attached to the casing and provided with depending teeth 71 between the beveled ends of which is adapted to engage the beveled edge of a dog 72 (Fig. 3) pivoted at 73 on a lug 74 of the yoke 57. This dog is normally urged into lower position by means of a spring 75, and the lower edge of the dog is provided with a lug 76 engaging the outline of a cam 77 (Fig. 2) on the end of the type carrier so that after the carrier has been moved to bring a selected type approximately to printing position and is then rotated to move the type form into contact with the platen a high portion of the cam 77 raises the dog into engagement with the rack. The coöperating beveled surfaces of these parts serve to draw the type form precisely into position to coöperate with the platen, and the full engagement of the dog and rack locks the carrier against movement until the type form passes out of contact with the platen, when the cam allows the dog to be moved out of engagement with the rack, so that the carrier may again be shifted to select another type form.

The means for inking the type forms comprises a pair of rolls 78 and 79 (Fig. 3) journaled at their ends in plates 80. Each of these plates is provided with a pair of trunnions 81 held in engagement with the edge of a plate 82 (Fig. 5) by means of a member 83 pivoted at its lower end to the plate 82 and pressed against the trunnions by a spring 84 attached at its other end to the yoke. The plate 82 is pivoted at its upper end to the yoke, and spring 84 normally holds its lower end against the yoke, so that the rolls are yieldingly held in position to be engaged and slightly raised by the type forms as the latter are rotated past them toward the platen.

Means are provided for guiding the paper in its passage over the printing bed and for holding it against inadvertent movement thereon, comprising a roll 85, journaled on the printing bed in front of the platen, and a resilient pressure foot 86 attached to the casing, but as the particular construction of this device forms no part of the present invention, a more detailed description thereof is unnecessary.

The operation of the check printing machine is briefly as follows: A check having been placed in proper position on the printing bed, the carrier is shifted by means of a handle 67 to select the initial type form, which is commonly the line of stars shown on the dial. The crank 56 is then rotated, by means of which the type carrier is rotated, and the selected type is accurately centered and locked in position opposite the platen. As the type approaches the platen the latter is raised in position to engage with it in rolling contact, to simultaneously print and feed the paper, and as the end of the type leaves the platen, the latter is retracted, and the locking device releases the carrier for movement to select the next type form. If the amount to be printed is, say, $546,003.19, the pointer 68 is successively placed over the characters "5", "Hundred", "40", "6", "Thousand", "3", "Dollars", "19", "Cents", and after each of the above adjustments the crank 56 is rotated to print the corresponding word or character. The check, having then moved across the printing bed, may be moved from the work slot at the rear of the machine.

The computing mechanism is supported and inclosed in a casing 87 attached to the back of the printing machine. Rotatably journaled in this casing and extending parallel with the shaft 43 is a shaft 88 to which is splined a mutilated gear 89 (Figs. 5 and 7) having a grooved hub 90 engaged by the forked end of an arm 91 (Figs. 1 and 5) fixed to one end of the type carrier yoke 57 of the printing machine. By this construction the member 89 is shifted longitudinally of the shaft 88 whenever the type carrier is moved to bring one of the type forms to printing position, and it is this shifting movement of the member 89 which brings it selectively into position to coöperate with other parts for the purpose of determining the extent of movement to be imparted to the computing mechanism. The location of the selector gear 89 on the shaft 88 is merely an expedient for obviating the inconvenience of attaching any gearing to the type carrier itself.

Fixed at one end of the shaft 43 of the printing machine is a gear 92 (Figs. 1, 2 and 17) meshing with a gear 93 fixed on the shaft 88 and serving as a means for rotating the latter shaft whenever the type carrier is rotated. The gear member 89 has its teeth cut away at a portion marked 89$^a$, (Fig. 5), which portion allows the gear to be moved longitudinally of its shaft without engaging its coöperating parts, when the type carrier is in position for selective movement, longitudinally of its shaft. These coöperating parts comprise a series of gears 94 fixed on a sleeve 95 rotatably carried by a shaft 96 which is journaled at its ends in the casing and extends parallel with shaft 88, so that by moving the selector gear 89 along its shaft it may be brought to position to mesh with any one of gears 94 when it is rotated by rotation of the type carrier. The shaft 96 carries a series of gears 97 adapted also to be engaged by the selector 89, but the gears 97 are fixed to a sleeve 98 which is pinned to the shaft 96 to rotate therewith. The selector 89 is also adapted to be brought by its sliding movement to position to engage in rotation with a gear 121 rotatably carried on the shaft 96. The gears 94 are all mutilated, having one to nineteen teeth, inclusive, in order from right to left as viewed in Fig. 10. The gears 97, likewise, are mutilated, having from two to nine teeth, inclusive. The gear 121 is also mutilated and has nineteen teeth. The selector gear 89 has nineteen teeth, the maximum number of teeth among the gears with which it engages, and is given one complete rotation by each rotation of the type carrier. The gears 94 and 97, when in initial position, all have their teeth starting at a common line parallel with the shaft and located so that the first tooth of each gear is adapted to be engaged by the first tooth of gear 89, upon rotation of the latter, as shown in Fig. 5, and it is the placing of the gear 89 selectively in position to engage and drive these gears, through distances corresponding to the varying number of teeth, that determines the extent of movement imparted to the computing mechanism. The series of gears 94 correspond to the digits from 1 to 19. The series of gears 97 correspond to the digits of the tens place from 2 to 9, while the gear 121 has to do with the recording of the digits of the hundreds place.

Fixed to the sleeve 95 are spaced gears 99, 100, 101, and 102 (Fig. 10). The gear 102 meshes with a gear 103 on a sleeve 104 rotatably carried by a shaft 105 journaled at its ends in the casing. The sleeve 104 has fixed at its other end a gear 106 which meshes with a pinion 107 journaled on the end of a stud 108 fixed at its other end in the casing. The pinion 107 meshes with a gear 109 on a sleeve 110, which is rotatably carried on the shaft 96 and has fixed at its other end a gear 111. From the construction described it will be understood that rotational movement of one of the gears 94 serves to rotate gear 111 a proportional distance in the reverse direction.

The shaft 96, which is rotated by rotation of one of the gears 97, has pinned at its opposite end the hub of a gear 122 which meshes with a gear 123 pinned to the shaft 105. The shaft 105 has fixed near its opposite end a gear 124 meshing with a pinion 125 journaled on the stud 108, and the pinion meshes with a gear 126 on a sleeve 127 which is rotatably carried on the sleeve 110 and has fixed at its opposite end a gear 128. From this construction it will be apparent that rotation of one of the gears 97 serves to rotate gear 128 a proportional distance in the reverse direction.

Figure 19:
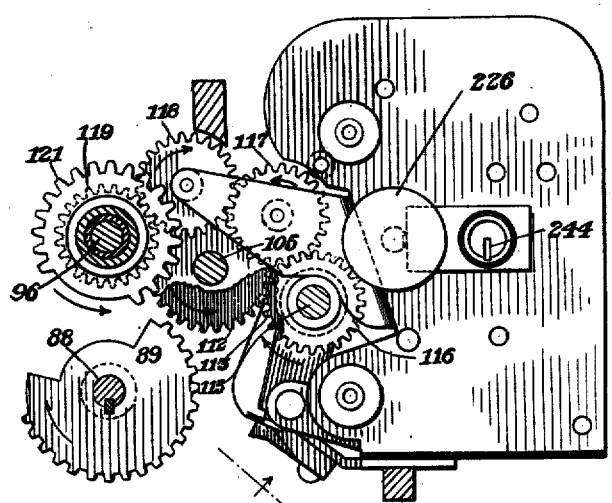
Fig. 19 is a sectional elevation on the line 19—19 of Fig. 7.

The sleeve 95, upon which are fixed the gears 94, has pinned to it the gear 99 which meshes with a gear 112 rotatably carried by the shaft 105. The gear 112 meshes with a gear 113 fixed on a sleeve 114 rotatably carried by a shaft 115 which is journaled at its ends in the casing. The sleeve 114 has fixed thereon a gear 116 meshing with a gear 117 (Fig. 19) which, in turn, meshes with the gear 118. Gears 117 and 118 are mounted on studs fixed in the casing, and the gear 118 meshes with a gear 119 fixed on a sleeve 120 rotatably mounted on the hub of gear 122 and carrying the gear 121 previously referred to. It will be apparent that when one of the gears 94 is rotated, this train of gearing will rotate the gear 121, but in a reverse direction, and the ratio of transmission is such as to impart to gear 121 the same extent of movement as is given the gear 94. As stated, gear 121 is mutilated, and has its first tooth on the same common line as the first teeth of gears 94, but the teeth of gear 121 are on the opposite side of this line from the teeth of gears 94, so that as the teeth of gears 94 are rotated out of engagement with gear 89, the teeth of gear 121 are rotated to a corresponding extent into position to engage gear 89, and vice versa.

When the type carrier is moved to bring the word "Hundred" into printing position, the selector gear 89 is brought into actuating lateral engagement with a contact piece 129 (Fig. 18) fixed on a swinging lever 130 pivoted at 131 to a bracket 132 projecting from the casing. The lever 130 is provided with a central opening 133 having lugs 134 extending inwardly and engaging the recess 135 in the hub 120 (Fig. 10). This hub 120 is slidable on the hub of the gear 122 and is provided at its outer end with a clutch face 136 adapted to coöperate with a corresponding part 137 on the gear 138 which is rotatable on the shaft 96. Whenever the selector gear 89 is moved to swing the lever 130, the hub 120 is shifted longitudinally so as to engage the clutch faces 136 and 137, thus forming a driving connection between the gears 121 and 138. A spring 130$^a$ (Fig. 7) normally holds the clutch parts out of engagement, and the gear 119 is of sufficient width to remain constantly in mesh with the gear 118 during the sliding movement of the hub 120.

Gear 138 meshes with a gear 139 which is rotatable on the shaft 105 and meshes in turn with a gear 140 pinned to the shaft 115. Near the other end of the shaft 115 is pinned thereto a gear 141 meshing with a gear 142 rotatable on the shaft 105 and meshing in turn with a pinion 143 journaled on the stud 108 and adapted to mesh with a gear 144. The latter gear is fixed on a sleeve 145 rotatably carried on the sleeve 127 and having fixed at its other end a gear 146. It will be apparent from the construction described that when clutch parts 136 and 137 are engaged and gear 121 is rotated, gear 146 will thereby be rotated a proportional distance in the reverse direction.

Figure 20:
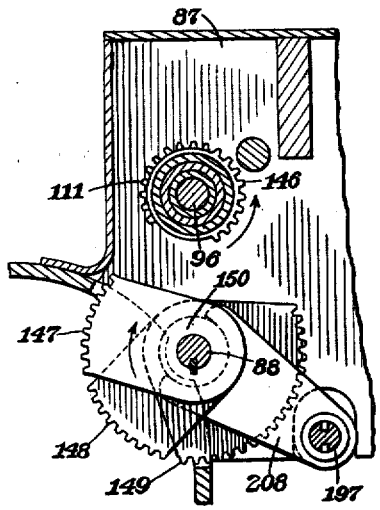
Fig. 20 is a sectional elevation of a portion of the mechanism taken on the line 20—20 of Fig. 7.

Thus when one of the gears 94 is rotated by means of gear 89, the gear 121 is rotated through the same distance into position to coöperate with gear 89 when the latter is moved to print the word "Hundred". Rotation of gear 89 in this position rotates gear 121 back to initial position, thereby returning gears 94 and 111 to initial position and rotating gear 146 a proportional distance in the reverse direction, for recording thereon the hundreds digit. Gears 94 and 111 are now ready for further subsequent operation. In like manner, the selection and rotation of one of gears 97 rotates gear 128 in a reverse direction a distance proportional to the number of teeth in the selected gear, thus recording on gear 128 a digit of the tens place. One of gears 94 may now be again selected and rotated to record on gear 111, in the same manner, a digit of the units place, and gear 121 now rotates idly with its clutch disengaged. Gears 111, 128 and 146 are each mutilated, gear 111 having nineteen teeth and gears 128 and 146 having each ten teeth. As shown in Fig. 20, each of these gears when in initial position has its teeth starting on a common line parallel with the shaft 96, in such position that the teeth are not engaged by the teeth of the respective actuating sector gears 147, 148 and 149 when the latter are rotated, as will be explained hereafter. But the reverse rotation of gears 111, 128 and 146 for recording digits thereon, as previously described, brings the teeth of these gears into such position that they may be engaged by their respective actuating sector gears, during the rotation of the latter, and thereby restored, or rotated back to initial position, as in the case of the gear 121.

Gear 121 may thus be said to form a storage device in that it serves to store or retain any digit printed in the units place so that should this digit be intended to designate a number of hundreds, as indicated by the subsequent printing of the word "Hundred," it may be transmitted to the gear 146 where the digits of the hundreds place are finally recorded. Gears 111, 128 and 146 form a second storage device in that they are rotated whenever a digit is printed in the units, tens and hundreds places, respectively, for storing or recording it. A record is thus made of the digits in groups of three or less so that they may be transferred to the proper accumulating devices of the mechanism upon designation of the significant places to which they belong, as when one of the denominational words "Thousand," "Dollars" or "Cents" is printed. When a record is made on the first storage device, or gear 121, it is moved from initial into operative position. It is then restored to initial position to move the corresponding gear 146 of the second storage device from initial to operative position. Similarly gears 111 and 128 of the second storage device are moved into operative position when a digit is stored thereon, and it is the restoration of these gears to their initial or inoperative positions which serves to move the accumulating devices later to be described.

The means for restoring the storage gears 111, 128 and 146 to initial position and thereby actuating the accumulating or registering devices, and also restoring the gears 94 and 97 to initial position, comprises three toothed sectors, 147, 148 and 149 (Figs. 15 and 20) fixed to the sleeve 150 splined on the shaft 88. The sleeve 150 is normally in such position longitudinally of the shaft 88 that the sectors do not register with and therefore do not engage the gears of the storage device, but by a means to be described later, the sleeve 150 may be slid longitudinally of the shaft to bring each of these sectors into position to engage its corresponding gear of the storage device upon rotation of the shaft 88. It is to be noted that the sectors are arranged successively in advance of each other circumferentially of the sleeve, so that they engage their respective gears in succession, and not simultaneously, during the rotation of the shaft 88.

Rotation of gear 146, which is the first engaged by its sector, rotates the pinion 143, gear 142 and gear 141, thus rotating the shaft 115. Splined to this shaft are two gears, 155 and 158 (Figs. 10 and 24), which may be termed the "motor gears," or "motor," since both of them are rotated whenever gear 146 of the storage device is rotated, but these motors rotate idly with the shaft until clutched to gears 168 and 171, respectively, by means later to be described, for actuating the accumulating devices. Gears 168 and 171 are rotatably mounted on shaft 115.

Rotation of the gear 128 of the storage device, which is next engaged by its actuating sector, rotates pinion 125, the gear 124, shaft 105, and the gears 161, 162 and 163 pinned to the latter shaft. These gears mesh with motor gears 152, 154 and 157 respectively, which are rotatably and slidably mounted on the hubs of the gears 165, 167 and 170 respectively. The latter gears are rotatably mounted on shaft 115, and the motor gears 152, 154 and 157 are adapted to be selectively clutched to them, as will be later explained, for actuating the accumulating devices.

Gear 111 of the storage device is rotated last in order by its sector on the shaft 88, and serves to rotate pinion 107, gear 106 and gear 108 fixed thereto, and thus to rotate the sleeve to which the gears 94 are fixed. Rotation of this sleeve rotates the gears 100 and 101 attached thereto, which gears in turn rotate the gears 159 and 160 respectively, journaled on the shaft 105. The gears 159, 160 and 103 mesh respectively with motor gears 156, 153 and 151, which are rotatably and slidably mounted on the hubs of gears 169, 166 and 164 respectively, to which latter gears the motor gears are adapted to be clutched, as in the case of the other motor gears.

Referring to Fig. 24 it will be seen that each of the gears 164 to 171 inclusive, is provided with a circular recess 172 into which the corresponding motor gear is adapted to be moved, and projecting from each of the gears 164 to 171 inclusive, is a pin 173 within the recess, which pin is adapted to engage between the teeth of the motor gear 157, thus clutching the two gears together. The motor gears are of sufficient width so that they remain in mesh with their actuating gears when moved into clutching engagement with the gears 164 to 171 inclusive. Each of the motor gears has its hub provided with a groove 174 adapted to be engaged by a shifting lever, which will now be described.

Figure 9:
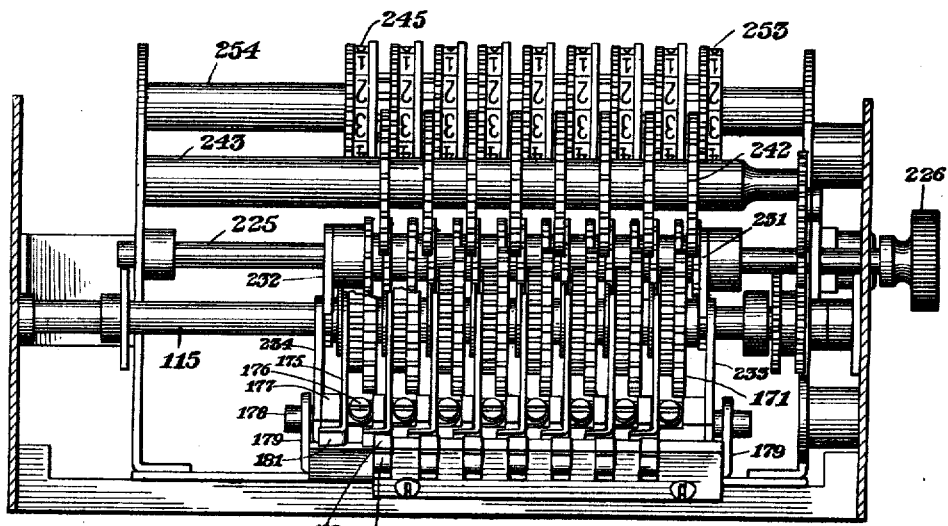
Fig. 9 is a sectional elevation of a portion of the computing mechanism taken on the line 9—9 of Fig. 5, looking toward the rear.
Figure 22:
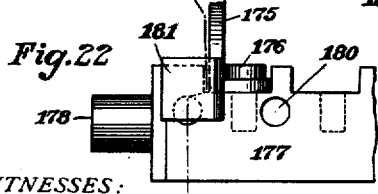
Fig. 22 is a fragmentary detail view of a portion of the mechanism as seen from the line 22 of Fig. 19.
Figure 23:
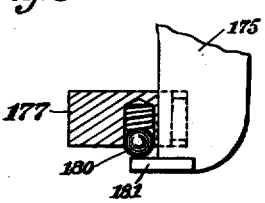
Fig. 23 is a section on the line 23—23 of Fig. 22.

The means for shifting the motor gears comprises a series of levers 175, (Figs. 5 and 9) each having a forked upper end for engagement with the groove 174 in the hub of the motor gear, and pivoted at 176, near its lower end, on a bar 177 having supporting pins 178 in its ends adapted to slide longitudinally in bearings in brackets 179 fixed to the casing. Adjacent each of these levers 175, the bar 177 is provided with a recess, and a spring-actuated ball 180 (Figs. 22 and 23) adapted to bear against an angular flange 181 formed on the lower end of each lever. This ball 180, pressing down upon the flange 181, serves to turn the lever 175 about its pivot, thus normally holding the corresponding motor gear in unclutched position. The flange 181 of each shifting lever is adapted to rest against the upper side of a curved end 182 (Fig. 5) of a movable bar 183 which serves to actuate the carrying devices to be later described.

The bars 183 are adapted to be raised, selectively, and to actuate the shifting levers 175, by a series of cams 184 to 191 inclusive, splined on a shaft 192 below, some of which are moved longitudinally of the shaft into operative position whenever each of the significant words "Thousand," "Dollars" and "Cents" is printed, thus designating the significance of the digits recorded on the storage device, that is, the places of the amount to which such digits refer, and thereby indicating the proper motors to be clutched to the accumulating devices. The cams 184 and 185 are fixed on a common sleeve and correspond respectively to the units and tens digits of the cents places of the amount. Cams 186, 187 and 188 are fixed on a common sleeve and correspond respectively to the units, tens and hundreds digits of the places of the amount designated by the printing of the word "Dollars." The cams 189, 190 and 191 are likewise fixed on a common sleeve and correspond respectively to the units, tens and hundreds digits of the places designated by the word "Thousand." Each of these sleeves is splined on the shaft 192 which is rotatably supported at its ends in the casing, and the shaft is rotated at each rotation of the type carrier by means of a gear 193 splined to the shaft and meshing with a gear 194 fixed to the shaft 88. Gear 193 is held against longitudinal movement on the shaft 192 by its engagement between the gear 93 fixed to the shaft 88 and the wall of the casing. Shaft 192 is normally urged toward the left as seen in Fig. 15, by a spring 195 surrounding the shaft and bearing at one end against a bracket 196 attached to the casing, and at its other end against a sleeve 197 slidably and rotatably mounted on the shaft. This sleeve bears against a collar 207 pinned to the shaft, and the movement of the shaft toward the left under the pressure of spring 195 is limited by collar 198 pinned to the end of the shaft and adapted to contact with the bracket 196. The means by which the various cams and the shaft are moved longitudinally toward the right in Fig. 15, will now be described.

Cams 189 to 191, inclusive, are connected by means of a spline member 199 in the shaft 192 to a grooved sleeve 200, by means of which these cams may be moved toward the right against a pin 201 in the shaft, thus simultaneously moving the shaft toward the right. This movement of the cams brings them into operating position beneath members 182 for operating the respective motor clutches. The sleeve upon which cams 186 to 188 are fixed is connected by means of a spline 202 with a grooved sleeve 203 by means of which the cams may be moved toward the right, and the sleeve 203 is adapted to contact with a pin 204 in the shaft for moving the shaft toward the right at the same time. The sleeve upon which cams 184 and 185 are fixed is connected by means of a similar spline 205 with a grooved actuating sleeve 206, which sleeve is adapted upon movement toward the right to engage the collar 207 pinned to the shaft 192 and to move the shaft to the right, as before. It is thus apparent that as any one of the three sets of cams is moved toward the right in Fig. 15, by means of its actuating sleeve, that set of cams is brought into operative position for actuating the corresponding motor clutches, and, at the same time, the shaft 192 is moved toward the right, and by means of its collar 207 also moves the sleeve 197. Fixed to this sleeve is an arm 208 having a forked upper end engaging the sleeve 150 between two of the sectors, 148 and 149, for the purpose of moving each of them into position to engage its respective gear of the storage device upon rotation of the type carrier.

Figure 21:
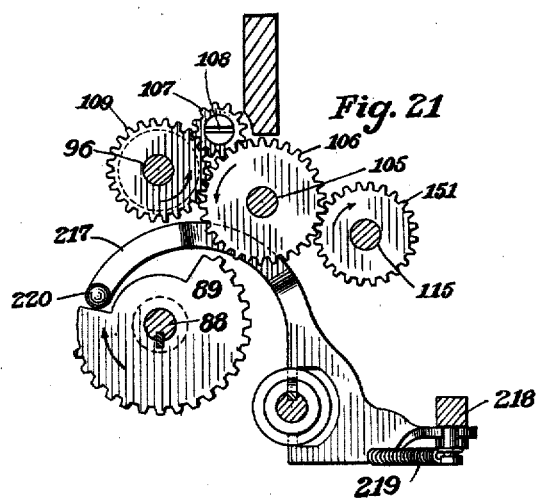
Fig. 21 is a sectional elevation taken on the line 21—21 of Fig. 7.

The means for moving the cams into operative position and sliding the shaft on which they are mounted comprise three levers, 209, 217 and 221, shown in Figs. 7 and 14, and in detail in Figs. 18 and 21. The lever 209 is pinned at its rear end to a cross piece of the frame at 210 (Figs. 14 and 18) and, extending forwardly, is provided with a pair of fingers 211 engaging in the groove of the actuating sleeve 200 on the shaft 192, for the purpose of shifting cams 189, 190 and 191 corresponding to the three places denoting thousands of dollars. The lever 209 extending forwardly and upwardly, has its end curved over at 212 and provided with a contact button 213. The selector gear 89 is provided, at that end of its toothed surface which is in advance during the rotation of the gear, with a beveled surface 215, and when the type carrier is moved to position to print the word "Thousand", the selector is brought to such position that, upon rotation, its surface 214 engages the button 213 of the lever 209 and turns the lever upon its pivot to the left, as viewed in Fig. 7, so that the corresponding cams are shifted to position to operate the proper clutches, and by means of the accompanying movement of shaft 192, sectors 147, 148 and 149 are moved into position to register with the corresponding gears of the storage device, to actuate the same upon rotation of the shaft 192. Lever 209 is normally urged to inactive position by means of a spring 216 attached to the lever and to the frame, and the movement of the lever in this direction is limited by the contact of a lug 216ª on the lever with a pin on the frame.

The lever 217, shown in detail in Fig. 21, is similar to the lever 209, being pivoted to the frame at 218, and is held normally in inactive position by the spring 219, and the lug 219ª on the lever which contacts with a pin on the frame to serve as a stop in this direction. The lever extends forwardly and upwardly over the shaft 88 and is provided at its forward end with a contact button 220 adapted to coöperate with the beveled surface 214 of the selector gear to move the lever to the left, as seen in Fig. 7, upon rotation of the selector gear, when the type carrier is moved to position to print the word "Dollars". Lever 217, engaging the actuating sleeve 203 on shaft 192, serves to move cams 186, 187 and 188 into position to operate the clutches of the motors corresponding to the units, tens and hundreds places of dollars, and, as before, to move the shaft 192 longitudinally to bring the sectors into position to actuate the gears of the storage device.

Lever 221 closely resembles the lever 217, being pivoted at its rear end to the frame at 222 and normally held in an inactive position by a spring 223. The forward end of this lever is provided with a contact button 224, which is adapted to coöperate with the beveled surface of the selector gear, upon rotation of the latter when the type carrier is moved into position to print the word "Cents". Correspondingly, this lever is adapted to engage and move the actuating sleeve 206 and thus to bring cams 184 and 185 to position to operate the clutches of the motors corresponding to the units and tens places of cents, and to move the shaft 192 longitudinally to bring the actuating sectors, as before, to position to actuate the gears of the storage device.

The means for reversing the direction of motion transmitted to the accumulating devices comprises a shaft 225 (Figs. 11 and 13) adjacent and parallel with the shaft 115, slidably supported at its ends in the casing, and provided exteriorly thereof with a finger piece 226. Rotatably mounted in pairs on this shaft are a plurality of pinions and each pair is fixed upon a common hub, as indicated at 227 and 228, there being a pair of these pinions corresponding to each of the motor driven gears 164 to 171. In each of these pairs, which are alike, the pinions are spaced apart and the pinion 227 meshes with its corresponding gear, as, for instance, gear 171. The latter gear has a wider face than the pinion, extending into the space between the two pinions. At each end of the series of pinions, the shaft 225 has fixed thereon collars 229 and 230 carrying, respectively, arms 231 and 232, each of which has a forked end embracing the shaft 115 and contacting with the hubs on which the end gears 171 and 151 are carried. All of the gears on the shaft 115 are adapted to be moved longitudinally of the shaft, so that when the shaft 225 is shifted longitudinally by means of the finger piece 226, the gears 164 to 171, inclusive, are shifted axially of the shaft with the corresponding pinions, and remain constantly in mesh therewith. The pinions 228 of the different pairs, when the shaft 225 is moved inwardly, or to the left, as viewed in Fig. 11, are adapted to mesh with a series of gears 235 to 242 inclusive, rotatably journaled on the shaft 243 supported at its ends in the casing, and in this relation of the parts, which is that shown in Fig. 5, gears 171 and 242, as also the other corresponding gears of these two series, are rotated in the same direction, as indicated by the arrows in the latter figure. When, however, the shaft 225 is moved outwardly, or toward the right, as viewed in Fig. 11, gear 171 and pinion 228 are moved toward the right, and gear 171 meshes directly with gear 242 before pinion 228 moves out of mesh therewith. This brings gear 242 between the two pinions 227 and 228, so that it is out of mesh with them, but meshes with that portion of the gear 171 which extends into the interval between the pinions. In this relation of the parts gear 242 is driven directly by gear 171, as is the case with the other corresponding gears of the two series, in a direction the reverse of that when the shaft is moved inwardly. It is to be noted that the pinion 227 is constantly in mesh with the gear 171 and, the pinions 227 and 228 being fixed together, the teeth of pinion 228 have a constant position relative to the teeth of the gear 171. This position is so adjusted that the teeth of gear 171 will always mesh with the teeth of gear 242, which is not disengaged by the pinion 228 until it is engaged by the pinion 171 alone. There is thus provided a convenient means for reversing the direction of motion transmitted to the accumulating devices and the construction is such that the driving and driven gears are always positively connected so as to be in position at all times to mesh with each other, and there can be no slip or loss of motion in the transmission.

The shifting movement of the motors and the gears to which they are adapted to be clutched necessitates some provision against actuation of the clutches by their levers during such movement. This is preferably provided for by making the bar 177 on which the clutch levers themselves are pivoted, shiftable longitudinally in its bearings whenever the motors are shifted, arms 233 and 234 being fixed to the bar and having forked upper ends embracing the shaft 115 in engagement with the arms 231 and 232. As may be seen the angular ends 181 of clutch levers 175 are of sufficient length to be constantly above the ends 182 of the levers 183, whatever the postion of longitudinal adjustment of the bar 177, so that the clutch levers will always be moved whenever the corresponding actuating cams are rotated in operative position.

In order to prevent any unauthorized operation of the machine, as, for instance, the addition of an amount to that shown by the accumulating devices for the purpose of covering up the printing of a fraudulent check on the machine, a means is provided for locking the member 226 by which the operation of the machine is changed from addition to subtraction, and vice versa. This means comprises a lock, indicated at 244, (Figs. 11 and 19), having a bolt adapted to engage either of two recesses 226ª in the shaft 225, and thus to lock this shifting member in either of its operating positions.

Adjacent and parallel with the shaft 243 is a shaft 254 supported at its ends in the casing and having rotatably mounted thereon a series of accumulating devices, or accumulating wheels, 245 to 253 inclusive, Figs. 5, 6 and 10. These wheels are provided with numerals from 0 to 9, and each wheel is provided on one side with a gear 255, (Fig. 10) and on the other side with disk 256. Fixed to each wheel also is a pinion 257, and each of these pinions is adapted to mesh with the corresponding one of the series of gears 235 to 242 inclusive, on the shaft 243, by means of which gears the accumulating wheels are driven. Referring to Fig. 5, where is shown the direction of rotation of the various parts when the reversing member 226 is moved inwardly, it will be apparent from the direction of rotation of the accumulating wheels, that this position of the member 226 corresponds to the operation of addition, and that when the member 226 is moved outwardly the operation will be that of subtraction. Wheels 245 and 246 indicate the digits of the units and tens places respectively, of cents. The remaining wheels indicate the various digits representing dollars, the wheel 253 indicating millions of dollars, but this wheel is actuated from the other wheels only, by a carrying mechanism which will now be described.

The series of levers 258 to 265 inclusive, (Figs. 5 and 8) are pivoted at their lower ends on a shaft 266 supported in the casing, and each lever has journaled on its upper end a carrying member 267. Each of these members is provided with gear teeth 268 (Fig. 6) meshing with the teeth of the gear 255 of the corresponding accumulating wheel. Every third tooth 269 on the carrying member is extended over the periphery of the disk 256 and adjacent teeth 269 are adapted to bear upon the smooth periphery of the disk during the revolution of the wheel. At one point of the periphery of the disk is a recess 270 (Fig. 5) adapted to receive one of the teeth 269, and the disk is provided on either side of this recess with a lateral projection 271, adapted, as the recess approaches the carrying member during rotation of the disk in either direction, to engage the teeth 268 of the carrying member and to rotate the latter to bring one of the teeth 269 into the recess. In the continued rotation of the disk the engagement of the tooth in the recess serves to rotate the carrying member through a small angle, the recess finally turning out of engagement with the tooth and leaving the carrying member as before, with two adjacent teeth 269 resting upon the periphery of the disk, which serves to lock the carrying member against rotation except under actuation of the disk as just described. It will be apparent that as a carrying member is rotated in this manner, once during each rotation of its accumulating wheel, the rotation of the carrying member will rotate the wheel of next higher order through a small angle corresponding to the distance between adjacent numerals, thus serving to carry from wheel to wheel, in either direction of operation of the wheels.

The carrying member is normally held in operative position by means of a spring 272 connected at one end to the lower end of the supporting lever and at its other end to the casing, but, as previously indicated, the carrying members are moved selectively out of engagement with the corresponding accumulating wheels in order to unlock them and permit direct transmission thereto of the actuating movements of the storage device. The means for thus retracting the carrying members from their wheels comprises a series of levers 183, previously referred to, which are respectively pivoted at one end to the levers 258 to 265 inclusive, and have their lower ends 182 disposed in position to be raised by the actuating cams when the latter are rotated in operative position. As is shown in Fig. 5, the actuating cams on each sleeve do not retract the corresponding carrying members simultaneously, but successively, beginning, preferably with the wheel of the highest order, and this timing, it will be noticed, corresponds with the timing of the actuation of the gears of the storage device, and is provided for the reason that, during the actuation of each accumulating wheel by the storage device, the carrying member between it and the wheel of next higher order must be in position to carry to the higher wheel.

Means is provided for guiding the levers supporting the carrying members during the retraction of the latter comprising a plate 274 (Fig. 5) supported at its ends by the casing and provided with guiding recesses in which the levers are moved. There is also provided a cross plate 275 having the beveled forward edge thereof in position to engage between the teeth of the carrying members, immediately they are moved out of mesh with the accumulating wheels, for the purpose of maintaining the teeth of the members in position to mesh again properly with their respective gears, as they are moved back into engagement therewith. There is also provided a bar 276 for arresting the movement of the levers 258 to 265 under actuation of the springs 272 to prevent undue pressure of the members against the accumulating wheels. The wheel corresponding to the units place of cents having no carrying member to lock it against inadvertent movement, there is provided on the frame a spring-pressed detent 276ᵃ adapted to engage the teeth of the gear 255 to restrain the movement thereof.

In order to prevent overtravel, or other inadvertent movement, of the gears 94 and 97, the gears 103 and 162 engaging indirectly therewith, respectively, are provided with spring pressed detent members 277 and 278 engaging the teeth of these gears (Figs. 5 and 6). A spring-pressed detent 140ᵃ (Fig. 16) is also provided for the gear 140 to prevent inadvertent movement of the shaft 115.

The casing inclosing the computing mechanism is provided above the accumulating wheels with alined openings 279 (Figs. 1 and 5) through which the amount indicated by the accumulating wheels may be read, and in order that the bank balance indicated on the wheels may not be exposed to public inspection, a small cover 280 is hinged on the casing and provided with a convenient locking means, so that the cover may be turned to hide the reading of the wheels and locked in such position.

The operation of the device is indicated by the description of the construction. When a deposit is to be made in the bank account the amount is printed on the deposit slip by means of the machine, the member 226 having been unlocked and moved inwardly so that the operation of the device is that of addition. If the amount deposited is, for instance, $546,003.19, the type carrier is moved to position to select the digit 5 for impression, thereby moving the selector gear 89 to position to engage that one of the gears 94 having five teeth. When the type carrier is rotated to make the impression the selector gear is rotated to rotate the gears 94 a distance corresponding to five teeth. This operates to rotate the units gear 111 of the storage device, and also the storage gear 121 through the connecting trains of gearing, a distance corresponding to five teeth, but in a reverse direction. The type carrier is then moved to select the word "Hundred", and the selector gear 89 is thereby moved to mesh with the gear 121 and to engage the clutch members 136 and 137. The rotation of the type carrier then operates to rotate the selector gear and thereby to restore the gear 121, as well as the gears 94 and the gear 111 of the storage device, to initial position. This movement of gear 121 operates through the connecting gears to rotate gear 146 of the storage device from initial position a distance corresponding to five teeth. The type carrier is then moved to select the word "Forty", which moves the selector gear to position to engage that one of the gears 97 having four teeth. Upon rotation of the type carrier the selector gear rotates the gears 97 from initial position a distance corresponding to four teeth, and by means of the connecting gears, the gear 128 of the storage device is moved from initial position a corresponding distance. The digit "6" is then selected for printing, which brings the selector gear into registry with that one of the gears 94 having six teeth. Upon printing this digit the selector gear rotates the gears 94 from initial position a distance corresponding to six teeth, and thereby rotates the gear 111 of the storage device from initial position a corresponding distance. The gears of the storage device have now been rotated to record the three digits in units, tens and hundreds places of thousands of dollars, and when the type carrier is moved to print the word "Thousand" the selector gear engages the lever 209, thereby shifting the cams 189, 190 and 191 into operative position and moving the shaft 192 so that the sectors 147, 148 and 149 are brought into registry with the corresponding gears of the storage device. Rotation of the type carrier then operates to rotate the cam shaft 192, whereby the cams 191, 190 and 189, in succession in the order named, raise the carrying members and engage the motor clutches corresponding to the hundreds, tens and units wheels of the thousands places respectively. At the same time the sectors 147, 148 and 149 in succession in the order named, engage the hundreds, tens and units gears of the storage device, rotating the latter back to initial position, and, by means of the connecting mechanism, rotating each of the respective accumulating wheels a distance corresponding to the digit printed. As these accumulating wheels are thus actuated successively, the carrying members of each wheel being returned to active position immediately upon completion of the actuation of the corresponding wheel, rotations of each of the wheels are properly carried over to the wheel of next higher order. It is apparent that the accumulating wheels are normally held locked against movement by jarring of the mechanism or tampering therewith, and as each wheel is unlocked it is simultaneously clutched to the actuating mechanism thereby preventing inadvertent movement of the wheel. As the type carrier is then moved to select the digit "3", the selector gear is brought into registry with that one of the gears 94 having three teeth, and upon rotation of the type carrier the selector rotates the gears 94 and thereby the gear 111 of the storage device, as well as the gear 121, a distance corresponding to three teeth. When the type carrier is moved to print the word "Dollars", the selector engages the lever 217 which shifts the proper cams on the shaft 192, as well as the shaft itself, to operating position, so that when the type carrier is rotated to print this digit the accumulating wheel indicating units of dollars is unlocked and its actuating mechanism clutched thereto, and the gear 111 rotated back to initial position thereby rotating the accumulating wheel a distance corresponding to three units. As nothing was added in the hundreds and tens places in this operation no rotation was imparted to the corresponding gears of the storage device, and therefore no movement was given to the corresponding accumulating wheels. The carrier is then moved to select the word "Nineteen", which moves the selector into registry with that one of the gears 94 having nineteen teeth, so that upon rotation of the type carrier the storage wheel 111 is rotated from initial position a distance corresponding to nineteen teeth. When the word "Cents" is then printed, by the engagement of the selector with the lever 221, the wheel corresponding to the units of cents is unclutched and actuated a distance corresponding to nineteen units, the rotations of this wheel being carried over the tens wheel at the proper intervals. This completes the registration upon the device of the deposit.

When it is desired to draw a check against the account, the member 226 is unlocked and moved outwardly to change the mode of operation from addition to subtraction. The device is again locked, and the checks are printed by the machine as desired, the amount of each check being automatically subtracted from the amount indicated on the accumulating wheels, so that these wheels indicate at all times the balance of the deposit remaining in bank. If at any time it is desired to return all of the accumulating wheels to zero position, it is only necessary to set the machine for subtraction, and to print an amount corresponding to the amount then indicated on the wheels. The subtraction of this amount automatically restores the accumulating wheels to zero position.

There has thus been provided a computing mechanism for adding to, or subtracting from a given sum of money in bank the various amounts printed by a check writing machine, accordingly as these amounts represent deposits in, or checks drawn on the bank. The computing mechanism requires no other attention than the ordinary operation of the check protecting machine itself, and affords an accurate and labor-saving means for keeping record of, and conveniently indicating, at all times, the balance in the bank to the credit of the account.

This invention is by no means to be limited to the embodiment herewith disclosed, which is intended to be merely illustrative of the principles involved. The present construction and arrangement of the parts is largely arbitrary, as will be seen, for instance, in the arrangement of the parts to conform to the present order of arrangement of the type forms on the carrier. Many changes could therefore be made in the construction described which would still fall within the scope of the present invention as defined in the accompanying claims.

Having thus described my invention, what I claim as new, and desire to secure by Letters Patent is:—

1. In a machine of the class described, the combination of means for printing selectively and successively various words denoting the digits of amounts and also in proper sequence words denoting the denominations of said digits, a storage device comprising differentially movable elements, devices whereby the differentially movable elements are moved to represent digits printed, an accumulator, and means for transferring values from the storage device to the accumulator as an incident to printing words denoting denominations.

2. In a machine of the class described, the combination of means for recording in succession words expressing digits and words denoting the denominations of the digits, mechanism for temporarily retaining one or more of the digits pending printing of the denomination thereof, an accumulating device, and means for transmitting the stored digits to said accumulating device when a word representing the denominational value of the digits is printed.

3. In a machine of the class described, the combination of means for temporarily retaining a record of values, means for printing both said values and a designation of their respective denominations, an accumulating device, and means for transmitting the stored value from the temporary retaining device to the accumulator when the denominational designation is printed.

4. In a machine of the class described, the combination of an accumulator, devices for temporarily retaining values, means for printing digit values and designations of the denominational orders, and means for entering the digit values in the temporary retaining device when printing the values and transferring said values to the accumulator as an incident to printing designations of the denominational orders.

5. In a machine of the class described, the combination of a totalizer constructed to operate in one direction to add and in the other direction to subtract, devices for temporarily retaining values, means for printing values and designations of the denominational orders thereof, means for entering values in the temporary retaining device as an incident to printing the same and then transferring the values from the temporary retaining device to the totalizer as an incident to printing the denominational designation, and means for determining the direction of operation of the totalizer during said transfer.

6. In a machine of the class described, the combination with means for printing in correct reading sequence words representing digits and the words "Thousand," "Dollars" and "Cents," of means for temporarily retaining a record of the digits printed until one of the words "Thousand," "Dollars" or "Cents" is printed, a totalizer, and means for actuating the totalizer under the control of the temporary retaining device when one of the words "Thousand," "Dollars" or "Cents" is printed.

7. A method of recording and registering a number consisting in printing, selectively and successively, various words denoting the digits of said numbers and also, in proper sequence, words denoting the denominations of said digits, retaining a record of digit words pending the subsequent printing of the associated denomination word, and transmitting the record of said digit words to accumulating devices, selectively, in accordance with the associated denomination word.

8. A method of recording and registering a number consisting in printing in succession words expressing the digits of said number and their respective denominations, in temporarily storing one or more of said digits pending the expression of the denomination thereof, and in subsequently transmitting said one or more stored digits to accumulating devices in accordance with the expressed denomination thereof.

9. A method of recording and registering a number consisting in printing in succession words expressing the digits of said number and their respective denominations, in registering a digit upon a storage device pending a partial expression of its denomination, in registering said stored digit upon a second storage device pending a further expression of its denomination, and in subsequently transmitting said digit selectively to accumulating devices in accordance with the complete expression of its denomination.

10. A method of recording and registering a number consisting in printing in succession words expressing the digits of said number and their respective denominations, in transmitting one or more of said digits to a plurality of storage devices pending an expression of the denomination of such stored digits, and in registering the latter, selectively, upon a plurality of accumulating devices in accordance with their expressed denomination.

11. The combination with a printing machine comprising a plurality of type forms movable, selectively, to printing position; and impressing means, said means and type forms having a relative printing movement; of adding and subtracting mechanism comprising means for effecting either mode of operation; means for controlling the extent of movement of said mechanism by the selective movement of said type forms; and means, actuated by the relative printing movement of said impressing means and type forms for actuating said mechanism.

12. The combination with a printing machine comprising a type carrier movable to bring a plurality of type forms, selectively, to printing position; and a platen, said carrier and platen having a relative printing movement; of a computing mechanism adapted for adding and subtracting and having means for effecting either mode of operation; means actuated by said selective movement of the type carrier for determining the extent of movement of said mechanism; and means actuated by said printing movement of the type and platen for moving said mechanism.

13. The combination with a printing machine comprising a plurality of type forms representing words adapted to be selectively employed for forming an expression of a number, and movable, successively, to a fixed printing position; and a platen, said type forms and platen having a relative printing movement, alternating with said selective movement of said forms, for printing said digits successively; of a computing mechanism; means actuated by said selective movement of the type forms for determining the extent of movement of said mechanism; and means actuated by said printing movement of the type forms and platen for moving said mechanism.

14. The combination with a printing machine comprising a plurality of type forms movable, selectively, to printing position; and a platen, said forms and platen having a relative printing movement; of adding and subtracting mechanism comprising means for effecting either mode of operation; means actuated by said printing movement of the type forms and platen for operating said mechanism; and coöperating means connected to said type forms and mechanism, respectively, and movable relatively to each other by the selective movement of said forms, for controlling the extent of actuation of said mechanism to correspond with the amount printed.

15. The combination with a printing machine comprising a plurality of type forms movable, selectively, to printing position; and a platen, said type forms and platen having a relative printing movement; of adding and subtracting mechanism, comprising means for effecting either mode of operation; a plurality of devices corresponding respectively to the type forms; means for coöperation with said devices to control the extent of movement of said mechanism, said devices and means being movable relatively to each other by the selective movement of said type forms: and means actuated by said printing movement of the type forms and platen for actuating said mechanism.

16. The combination with a printing machine comprising a series of types movable, selectively, to printing position; and a platen, said types and platen having a relative printing movement; of adding and subtracting mechanism comprising means for effecting either mode of operation; a series of devices corresponding to the series of types; means, moved by said selective movement of the types, for coöperating, selectively, with said series of devices, for controlling the extent of movement of said mechanism; and means, operated by said printing movement of the types and platen, for operating said mechanism.

17. The combination with a printing machine comprising a series of types representing a series of words adapted to be selectively employed for printing a number, said types being movable, selectively, to printing position; and a platen, said types and platen having a relative printing movement; of a computing mechanism comprising a series of parts corresponding respectively to said series of types, each part being adapted to be moved a distance proportional to its corresponding digit; selecting means positioned by the selective movement of the types for effecting, selectively, characteristic movements of said parts and controlling the extent of movement of said mechanism; and means, actuated by said printing movement of the types and platen, for operating said mechanism.

18. The combination with a printing machine comprising a plurality of type forms adapted for printing the various digits of an amount and movable, selectively, to printing position; and a platen, said type forms and platen having a relative printing movement; of a computing mechanism comprising a plurality of mutilated gears, one corresponding to each of said type forms; a selector gear adapted to be moved by the selective movement of said type forms to coöperate with said mutilated gears to control the extent of movement of said mechanism; and means actuated by said printing movement of the type forms and platen for operating said mechanism.

19. In a computing mechanism, a storage device adapted to receive movements of varying extent for recording a digit of an amount; means for moving said device comprising a series of parts corresponding to a series of digits, and each movable a distance proportional to its corresponding digit; a common actuating member for selectively moving said parts and thereby moving said storage device; accumulating devices adapted to be moved by said storage device; and means for restoring said storage device to initial position and moving said accumulating devices to register said digit thereon.

20. The combination with a printing machine comprising a plurality of types adapted for printing an amount; and a platen, said types and platen having a relative printing movement; of a computing mechanism comprising a storage device adapted to have recorded thereon a plurality of digits of said amount; accumulating devices; means for moving said storage device to record said digits; and means, controlled by the movement imparted to said storage device, and actuated by said printing movement of the types and platen, for moving said accumulating devices and registering said digits.

21. The combination with a printing machine comprising a plurality of types adapted for printing an amount and movable, selectively, to printing position; and a platen, said types and platen having a relative printing movement; of a computing mechanism comprising a storage device adapted to have recorded thereon a plurality of digits of said amount; accumulating devices; means controlled by said selective movement of the types for moving said storage device to record said digits; and means controlled by the movement imparted to said storage device, and actuated by said printing movement of the types and platen, for moving said accumulating devices and registering said digits thereon.

22. The combination with a printing machine comprising a plurality of types adapted for printing an amount and movable, selectively, to printing position; and a platen, said types and platen having a relative printing movement; of a computing mechanism comprising a storage device adapted to have recorded thereon a plurality of digits of said amount; accumulating devices; means controlled by said selective movement of the types for moving said storage device to record said digits; and means actuated by said printing movement of the types and platen for restoring said storage device to initial position and moving the accumulating devices to register said digits.

23. The combination with a printing machine comprising a plurality of types adapted for printing an amount and movable, selectively, to printing position; and a platen, said types and platen having a relative printing movement; of a computing mechanism comprising a storage device adapted to have recorded thereon a plurality of digits of said amount; accumulating devices; means adapted to be moved in accordance with the selective movement of the types for moving said storage device and recording said digits; and mechanism, actuated by said printing movement of the types and platen for restoring said storage device and said means to initial position and moving said accumulating devices to register said digits.

24. The combination with a printing machine comprising a plurality of types movable, selectively, to printing position; and a platen, said types and platen having a relative printing movement; of a computing mechanism comprising a storage device; a plurality of members each adapted to be moved by said relative movement of the types and platen a distance determined by said selective movement of the types for imparting movement to said storage device; means for restoring said storage device and said members to initial position; and accumulating devices adapted to be moved by said restoring movement.

25. In a computing mechanism, a storage device comprising a mutilated gear adapted to be rotated through varying distances proportional to a series of digits; means for variably rotating said gear for recording a digit thereon; a storage device comprising gears to be selectively actuated by the mutilated gear; means for establishing operative relationship between the mutilated gear and any desired gear of the storage device; accumulating devices adapted to be moved by the storage device; and means for restoring said storage device to initial position and moving said devices to register said digit thereon.

26. In a computing mechanism, a storage device comprising a plurality of mutilated gears, each adapted to be rotated through varying distances proportional to a series of digits; means for variably rotating each gear for recording a digit thereon; accumulating devices adapted to be moved by said storage device; and means for successively restoring said gears to initial position and moving said accumulating devices for registering said digits thereon.

27. The combination with a printing machine comprising a plurality of types adapted for printing the various digits of an amount by individual and successive impression; and a platen, said types and platen having a relative printing movement; of a computing mechanism comprising a storage device; means for moving said storage device to record a plurality of digits; an accumulating device; and means, actuated by said printing movement of the types and platen, for registering on said accumulating device the digits recorded on said storage device.

28. In a computing mechanism, a plurality of storage devices; an accumulating device; means for moving one of said storage devices to record an amount thereon; and mechanism operating to transfer said recording movement successively from one storage device to another and to said accumulating device.

29. In a computing mechanism, a plurality of storage devices; an accumulating device; means for moving one of said storage devices to record an amount thereon; and mechanism, operating successively to restore said storage device to initial position and thereby move a second storage device, and to restore said second device to initial position and thereby move said accumulating device, for transmitting said recording movement successively from one storage device to another and to said accumulating device.

30. In a computing mechanism, a storage device; means for moving said device to record an amount thereon; a second storage device; means for connecting said first device to said second device; means for restoring said first storage device to initial position and thereby moving said second storage device; an accumulating device; and means for restoring said second storage device to initial position and moving said accumulating device to register said amount thereon.

31. In a computing mechanism, a storage device; means adapted to be moved to move said device for recording an amount thereon; a second storage device; means for connecting said first device to said second device; means for restoring said first storage device and said movable means to initial position and thereby moving said second storage device; an accumulating device; and means for restoring said second storage device to initial position and thereby moving said accumulating device for registering said amount thereon.

32. In a computing mechanism, a plurality of storage devices; a plurality of accumulating devices; means for moving one of said storage devices for recording a digit thereon; means for restoring said storage device to initial position and thereby moving a second storage device to record said digit; means for connecting said second device, selectively to said accumulating devices; and means for restoring said second device to initial position and moving said accumulating devices to register said digit thereon.

33. The combination with a printing machine comprising a plurality of types adapted for printing in words the various digits of an amount, and also words indicative of the denominations of said digits; and a platen; of a computing mechanism comprising a storage device; a plurality of accumulating devices; means for recording a digit on said storage device; and means for transferring said record from the storage device to said accumulating devices, selectively, in accordance with the denomination word associated with said digit.

34. The combination with a printing machine comprising a plurality of types adapted for printing successively in order words denoting the various digits of an amount, and also associated words indicating the denominations of the respective digits; and a platen; of a computing mechanism comprising a plurality of accumulating devices; a storage device adapted to have recorded thereon a plurality of digits of the amount; means actuated by the printing of each digit for recording it on said storage device; and means actuated by the printing of each of said denomination words for successively clearing said storage device and transmitting the record of said digits, selectively, to said accumulating devices in accordance with the denominations of the respective digits.

35. In a computing mechanism, a storage device; means for moving said device to record thereon a plurality of digits; a plurality of accumulating devices; an actuating means for each accumulating device adapted to be moved by the movement of said storage device; means for selectively connecting said actuating means with their respective accumulating devices; and means for restoring said storage device to initial position and moving the selected accumulating devices to register said digits thereon.

36. In a machine of the class described, the combination of a storage device, means for printing in correct reading sequence words representing digits and denominational values, a set of accumulating wheels, means for actuating the storage device when words representing digits are printed and means for clearing the storage device into the accumulating device when words representing denominational values are printed.

37. The combination with a printing machine comprising a plurality of type adapted for printing an amount, and movable, selectively, to printing position; of a computing mechanism comprising a storage device; means controlled by said selective movement of the types for moving said device to record a digit thereon; a plurality of accumulating wheels; means, also controlled by said selective movement of the types for connecting said wheels, selectively, with the storage device; and means for restoring said storage device to initial position and moving said wheels to record said digit thereon.

38. In a computing mechanism, a storage device; means for moving said device for recording a digit thereon; a plurality of accumulating wheels; a two-way carrying mechanism for said wheels; means for connecting said wheels, selectively, to said storage device; means for restoring said storage device to initial position and moving said wheels to record a digit thereon, and means for reversing the movement imparted to said wheels for adding or subtracting said digit.

39. In a computing mechanism, a storage device; means for moving said device for recording a digit thereon; a plurality of accumulating wheels; means for bringing said wheels, selectively, into coöperative relation with said storage device; means for imparting to said wheels movements determined in extent by said movement of the storage device; and means for reversing the direction of motion imparted to said wheels.

40. In a computing mechanism, a plurality of accumulating wheels; means for actuating said wheels; and reversing mechanism connecting each of said wheels with its actuating means, comprising a driven member, a pair of constantly engaged oppositely moving driving members, and means for bringing said driven member into engagement with either of said driving members, said parts being so constructed that said driven member is constantly engaged with one or both of said driving members for preventing lost motion between said members.

41. In a computing mechanism, a storage device; means for moving said device for recording a digit thereon; a plurality of accumulating wheels; means for bringing said wheels, selectively, into coöperative relation with said storage device; means for imparting to said wheels movements determined in extent by said movement of the storage device; means for reversing the direction of motion imparted to said wheels; and means for locking said reversing means against operation.

42. In a computing mechanism, a storage device; means for moving said device for recording a digit thereon; a plurality of accumulating wheels; two-way carrying mechanism for said wheels; means for bringing said wheels, selectively, into coöperative relation with said storage device; means for imparting to said wheels movements determined in extent by said movement of the storage device; and means for reversing the direction of motion imparted to said wheels.

43. The combination with a printing machine comprising a plurality of types movable, selectively, to printing position; and a platen, said types and platen having a relative printing movement; of a computing mechanism comprising a plurality of accumulating devices; a two-way carrying mechanism for said devices; means actuated by said printing movement of the types and platen for moving said devices; means actuated by said selective movement of the types for determining the extent of movement of said devices; and means for reversing the direction of motion imparted to said devices.

44. In a computing mechanism, a storage device; means for moving said device to record a plurality of digits thereon; a plurality of accumulating devices adapted to be connected to said storage device for actuation thereby; carrying mechanism for said accumulating devices; means for connecting said accumulating devices, selectively, to said storage device; and means for imparting to said accumulating devices, in succession, movements determined in extent by said recording movement of the storage device, thereby permitting the operation of said carrying mechanism.

45. In a computing mechanism, a plurality of storage devices; means for moving said devices to record a plurality of digits thereon; a plurality of accumulating devices adapted to be connected, selectively, with said storage devices; carrying mechanism for said accumulating devices; and means for restoring said storage devices to initial position and moving said accumulating devices, in succession, to permit the operation of said carrying mechanism.

46. In a computing mechanism, a plurality of actuating means; a plurality of accumulating devices; carrying mechanism for said devices; means for connecting said actuating means, selectively, with said accumulating devices; and means for successively moving said actuating means to move said accumulating devices, successively, and thereby permit the operation of said carrying mechanism.

47. In a computing mechanism, a plurality of actuating means; a plurality of accumulating devices; two-way carrying mechanism for said devices; means for connecting said actuating means, selectively, with said accumulating devices; means for reversing the direction of motion imparted to said accumulating devices; and means for successively moving said actuating means for moving said accumulating devices, successively, and thereby permitting the operation of said carrying mechanism.

48. The combination with a printing machine comprising a plurality of types, adapted for printing an amount, and movable, selectively, to printing position; and a platen, said types and platen having a relative printing movement; of a computing mechanism comprising a plurality of accumulating devices; means for actuating said devices; and means for connecting said actuating means, selectively, with said accumulating devices, comprising members moved to operative position by said selective movement of the types, and operated by said printing movement of the types and platen.

49. The combination with a printing machine comprising a plurality of type forms adapted for printing an amount and movable, selectively, to printing position, and a platen, said type forms and platen having a relative printing movement, of a computing mechanism comprising a plurality of accumulating devices, means for actuating said devices, and a plurality of cam members adapted to be brought selectively to operative position by said selective movement of the type forms and to be operated by said printing movement of the type forms and platen for connecting said devices, selectively, to said actuating means.

50. In a computing mechanism, a plurality of accumulating devices; means for actuating said devices; and means for connecting said actuating means, selectively, to said accumulating devices, comprising a shaft, a pair of cams each slidable on said shaft, a pair of collars at one side of said pair of cams and each slidable on said shaft for actuating said cams respectively, and spline members in said shaft each adapted to connect a collar with its respective cam and to pass with said shaft through intervening parts thereon.

51. The combination with a printing machine comprising a type carrier provided with type forms for printing an amount and movable to bring said forms, selectively, to printing position; and a platen, said carrier and platen having a relative printing movement; of a computing mechanism comprising a storage device; means, actuated by said selective movement of the carrier, for determining the extent of movement imparted to said device; accumulating devices; and mechanism, actuated by said printing movement of the carrier and platen, for moving said storage device to record a number thereon pending the printing of subsequent characters and for subsequently transmitting said recording movement of the storage device to said accumulating devices for registering the amount printed.

52. The combination with a printing machine comprising a type carrier provided with type forms adapted for printing an amount, and movable to bring said forms, selectively, to printing position; and a platen, said carrier and platen having a relative printing movement; of a computing mechanism comprising a plurality of storage devices; accumulating devices; means actuated by said selective movement of the carrier for predetermining the movement to be imparted to said storage devices; and means actuated by said printing movement of carrier and platen, for moving one of said storage devices to record a number thereon and for subsequently transmitting said recording movement from one storage device to another and to said accumulating devices for registering said number thereon.

53. The combination with a check printing machine comprising a type carrier provided with type forms adapted for printing an amount, and movable to bring said forms, selectively and successively, to printing position; of a computing attachment comprising accumulating devices, and adding and subtracting mechanism, adapted to be actuated by the operation of said machine, for adding and subtracting amounts printed thereby and indicating a balance on said devices.

54. The combination with a check printing machine comprising a type carrier provided with type forms adapted for printing an amount and movable to bring said forms, selectively and successively, to printing position; of a computing attachment comprising adding and subtracting mechanism, adapted to be actuated by the operation of said machine, for adding and subtracting amounts printed thereby to compute a balance; accumulating devices; a casing for said attachment apertured to display said devices; a movable cover for said devices; and means for locking said cover over said devices to prevent inspection thereof.

55. In a machine of the class described, the combination of check writing mechanism comprising type forms for correctly writing various amounts in words, and means for selectively printing from said forms in writing amounts, an adding and subtracting totalizer, a storage device, and means for actuating the storage device when certain words of an amount are written and actuating the totalizer under the control of the storage device when other words of an amount are written.

56. In a machine of the class described, the combination of check writing mechanism comprising type forms for correctly writing various money values in words, means for selectively printing from said forms in writing money values, an adding and subtracting totalizer, a storage device, means for actuating the storage device when certain words of a money value are written and actuating the totalizer under the control of the storage device when other words of such money value are written, a manipulative device, and means controlled by said manipulative device for determining whether the actuation of the totalizer is to effect addition or subtraction.

57. In a machine of the class described, the combination with a totalizer comprising an element for each of a plurality of decimal orders, of mechanism for printing various money values in words and means controlled by said printing mechanism for actuating different groups of totalizer elements as an incident to printing certain ones of the words.

58. In a machine of the class described, the combination with a totalizer comprising an element for each of a plurality of decimal orders, of mechanism for printing a monetary amount in words and means controlled by the printing mechanism for successively actuating different groups of totalizer elements as an incident to printing certain ones of the words.

59. In a machine of the class described, the combination with a totalizer comprising an element for each of a plurality of decimal orders, of mechanism for printing monetary amounts in words and means controlled by the printing mechanism for actuating denominational sections of the totalizer successively from higher to lower orders when certain words are printed.

GUSTAVE F. MAISCH.

Witnesses:
EDW. H. CUMPSTON, Jr.,
JOHN KIDSTON.

Copies of this patent may be obtained for five cents each, by addressing the "Commissioner of Patents, Washington, D. C."